(12) United States Patent
Murai et al.

(10) Patent No.: US 6,844,517 B2
(45) Date of Patent: Jan. 18, 2005

(54) POWER SUPPLY DEVICE FOR ELECTRIC DISCHARGE MACHINE

(75) Inventors: Masao Murai, Yamanashi (JP);
Akiyoshi Kawahara, Yamanashi (JP);
Akihiro Sakurai, Yamanashi (JP);
Yasuo Nakashima, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/735,830

(22) Filed: Dec. 16, 2003

(65) Prior Publication Data

US 2004/0124189 A1 Jul. 1, 2004

(30) Foreign Application Priority Data

Dec. 16, 2002 (JP) ........................................ 2002-363741

(51) Int. Cl.[7] ................................................. B23H 1/02
(52) U.S. Cl. .................................. 219/69.13; 219/69.18
(58) Field of Search ............................ 219/69.13, 69.18

(56) References Cited

U.S. PATENT DOCUMENTS

| | | | | | |
|---|---|---|---|---|---|
| 4,242,555 | A | * | 12/1980 | Delpretti | 219/69.17 |
| 4,695,696 | A | * | 9/1987 | Ozaki et al. | 219/69.18 |
| 6,107,593 | A | * | 8/2000 | Tsai et al. | 219/69.13 |
| 6,660,957 | B1 | * | 12/2003 | Ohguro et al. | 219/69.13 |

FOREIGN PATENT DOCUMENTS

| JP | 46-24678 | | 7/1971 |
|---|---|---|---|
| JP | 59-161230 | | 9/1984 |
| JP | 63-312017 | A * | 12/1988 |

* cited by examiner

Primary Examiner—Geoffrey S. Evans
(74) Attorney, Agent, or Firm—Staas & Halsey LLP

(57) ABSTRACT

A power supplying device for an electric discharge machine prevents electric discharge by a voltage from a subsidiary power supply circuit during a delay time from generation of the electric discharge to a rise of a voltage from a main power supply circuit. A parallel circuit, of a current reducing resistor and a capacitor, is provided in series in the subsidiary power supply circuit. A controller turns on the subsidiary power supply circuit to apply a voltage between a first electrode and a workpiece, as a second electrode, to generate an electric discharge therebetween, electricity charging the capacitor flowing between the electrodes to maintain the electric discharge even if an electric discharge current oscillates. The controller further turns on a main power supply circuit to supply a machining current in response to detection of the electric discharge and the current reducing resistor suppresses any leakage current during the application of the voltage from the subsidiary power supply circuit.

2 Claims, 4 Drawing Sheets

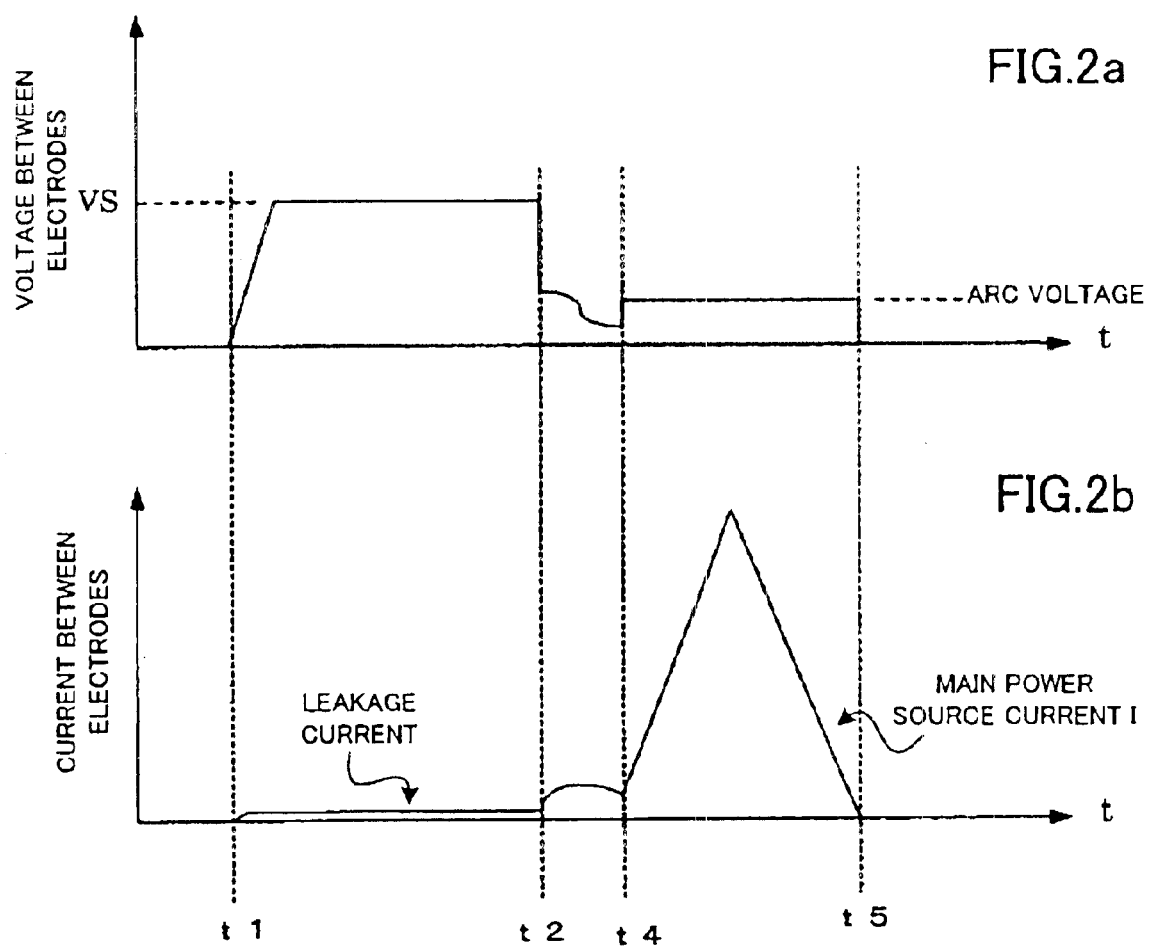

POWER SUPPLY DEVICE FOR ELECTRIC DISCHARGE MACHINE

BACKGROUND OF THE INVENTION

1. Field of the Invention

The present invention relates to a power supply device for electric discharge machining by an electric discharge machine.

2. Description of Related Art

In a recent electric discharge machine, a voltage is applied between an electrode and a workpiece from a subsidiary power supply circuit to urge generation of an electric discharge between the electrode and the workpiece, and when generation of the electric discharge is detected a machining pulse current of large amount is supplied from a main power supply circuit, as disclosed in JP 46-24678 B. According to this method, it takes a considerable time from the time of application of the voltage between the electrode and the workpiece from the subsidiary power supply circuit to a stable flow of machining current of large amount from the main power supply circuit in response to the detection of the electric discharge to attain a stable electric discharge. Particularly, there is a time lag of several hundreds of nanoseconds in a period from the generation of the electric discharge to the actual flow of the machining current (a rise of the voltage from the main power source) because of operating time of a detection circuit for detecting a generation of the electric discharge and switching elements and a rise time of the machining current from the main power supply circuit. In this period, to maintain the electric discharge, it is necessary to flow the current from the subsidiary power supply circuit. However, if the current is too small, an inductance and a capacitance between the power cable and the gap between the workpiece and the electrode are resonated to vibrate the current to be intermitted.

FIGS. 3a and 3b shows a phenomenon of intermission of the electric discharge. In FIG. 3a, an axis of abscissa represents time and an axis of ordinate represents a voltage between the electrode and a workpiece as the other electrode, and VS denotes a voltage applied from a subsidiary power supply circuit and VM denotes a voltage applied from the main power supply circuit for machining. In FIG. 3b, an axis of abscissa represents time and an axis of ordinate represents a current between the electrodes.

At time t1, the voltage VS is applied between the electrodes from the subsidiary power supply circuit and an electric discharge occurs between the electrodes at time t2. A slight leakage current flows between the electrodes from the time t1 to the time t2, and when the electric discharge occurs at the time t2 the current between the electrodes increases and the voltage between the electrodes decreases. The increase of the current or the decrease of the voltage between the electrodes is detected by an electric discharge generation detection circuit and the machining voltage VM is applied between the electrodes from the main power supply circuit. An appearance of the voltage VM between the electrodes is delayed by several hundreds of nanoseconds by operating time of the electric discharge generation detection circuit and the switching elements and rise time of the machining current from the main power supply circuit due to an inductance component of the power cables, etc. Due to the delay, the main voltage VM is actually applied between the electrodes at time t4, as shown in FIG. 3a. The electric current vibrates by the inductance and the floating capacitance of the power cable and the gap between the electrodes to cause a phenomenon of intermitting the electric discharge, i.e. the electric discharge current drops to "0" at time t3 by the vibration of the current in a delay period from the time t2 to the time t4, as shown in FIGS. 3a and 3b. Since the electric discharge is intermitted, the electric discharge for machining can not be generated by application of the main voltage VM from the main power supply circuit.

It may be considered to maintain the electric discharge for preventing the intermission of the electric discharge by increasing the current from the subsidiary power supply circuit. FIGS. 4a and 4b show a state where the current supplied from the subsidiary power supply circuit is increased. In FIG. 4a, an axis of abscissa represents time and an axis of ordinate represents a voltage between the electrodes. In FIG. 4b, an axis of abscissa represents time and an axis of ordinate represents a current between the electrodes. In this case, the electric discharge is maintained not to be intermitted in the delay period from the time t2 at which the electric discharge is generated to the time t4 at which the main current from the main power supply circuit rises, so that the machining current I is flown from the main power supply circuit. However, since the leakage current between the electrodes when applying the voltage from the subsidiary power supply circuit is increased from the time t1 to the time t2 especially in the case where water is used as machining fluid, so that electric corrosion of the workpiece and adhesion of material of the electrode on a surface of the workpiece are increased to deteriorate quality of a machined surface.

Further, there is known an arrangement for preventing the intermission of electric discharge by connecting a series circuit composed of a capacitor and an inductor between the electrode and the workpiece in parallel so that the capacitor is charged when a voltage from the subsidiary power supply circuit is applied between the electrodes and when the electric discharge is generated a current from the capacitor is flown between the electrodes, to prevent the intermission of the electric discharge even if the electric discharge vibrates in the delay period from the generation of the electric discharge to the time of rise of the main current from the main power supply circuit, from JP 59-161230 A for example. In this arrangement, there rises a problem of delay of rise of the voltage from the subsidiary power supply to lower frequency of electric discharge. Further, in a case where an electric discharge is generated immediately after the application of the voltage from the subsidiary power supply, the capacitor is not sufficiently charged with electricity to fail in effectively preventing the intermission of the electric discharge.

SUMMARY OF THE INVENTION

The present invention provides a power supplying device for electric discharge machine capable of maintaining an electric discharge between an electrode and a workpiece not to be intermitted in delay time from generation of the electric discharge to rise of a voltage from a main power supply circuit without increasing a leakage current.

A power supply device for an electric discharge machine of the present invention comprises: a subsidiary power supply circuit to urge generation of an electric discharge by applying a voltage between the electrode and the workpiece, said subsidiary power supply circuit including a direct current power source, an switching element and a parallel circuit composed of a current reducing resistor and a capacitor, which are connected in series; a main power supplying circuit for supplying a machining current between the electrode and the workpiece; and a controller for controlling said subsidiary power supply circuit to apply the voltage between the electrode and the workpiece and controlling said main power supply circuit to apply the machining current when the generation of the electric discharge between the electrode and the workpiece is detected. With the above arrangement, the electric discharge is securely maintained not to be intermitted in the delay time by a sufficient current supplied through the capacitor in the delay time even if an electric discharge current vibrates in the delay time. The current reducing resistor suppresses the leakage current during the application of the voltage from the subsidiary power supply circuit to prevent an electric corrosion of the workpiece and an adhesion of material of the electrode to a surface of the workpiece.

The subsidiary power supply circuit may further include a resistor connected in series for suppressing a vibration of the voltage between the electrode and the workpiece caused by capacitance of the capacitor and inductance of power cables.

BRIEF DESCRIPTION OF THE DRAWINGS

FIGS. 2a and 2b are diagrams showing operation of the power supply device;

DETAILED DESCRIPTION

Figure 1:
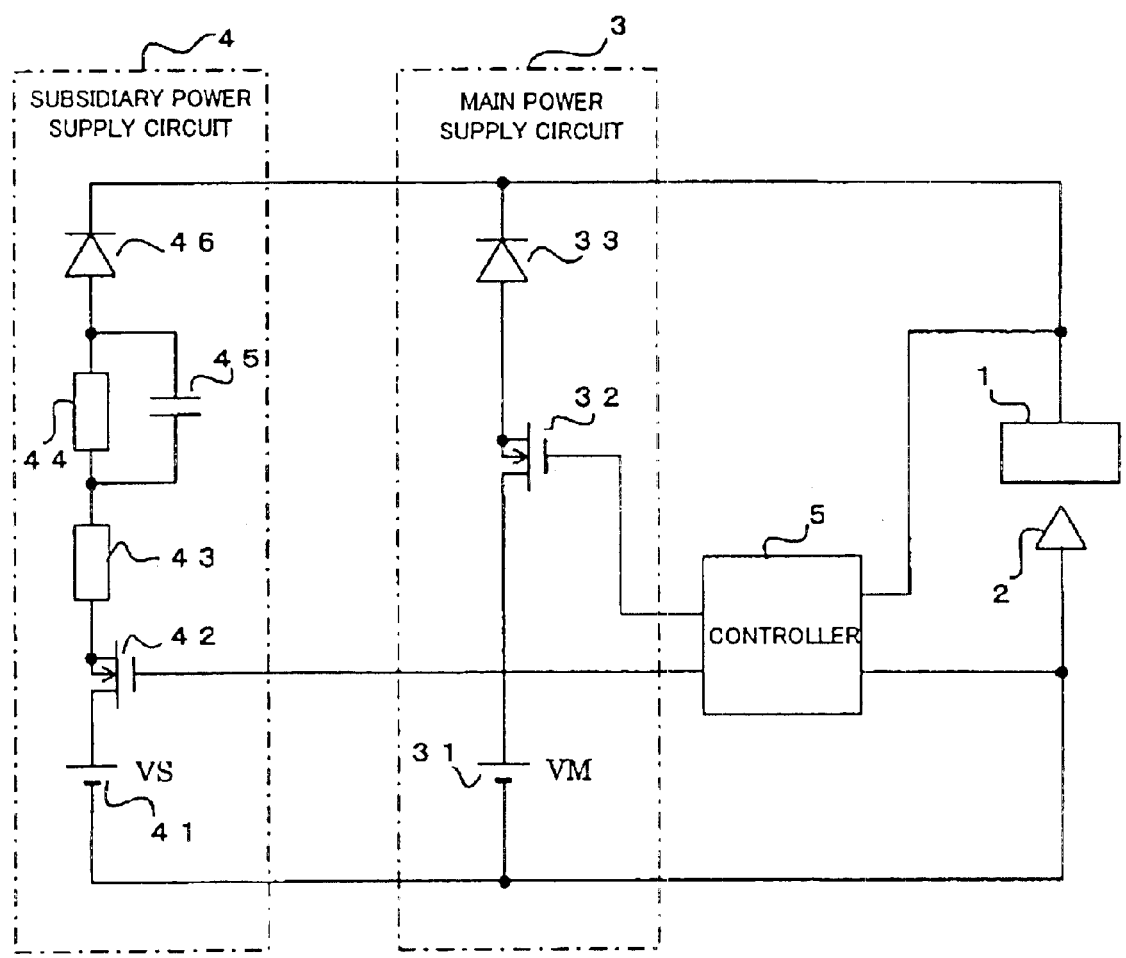
FIG. 1 is a circuit diagram of a power supply device for an electric discharge machine according to an embodiment of the present invention.
Figure 3A:
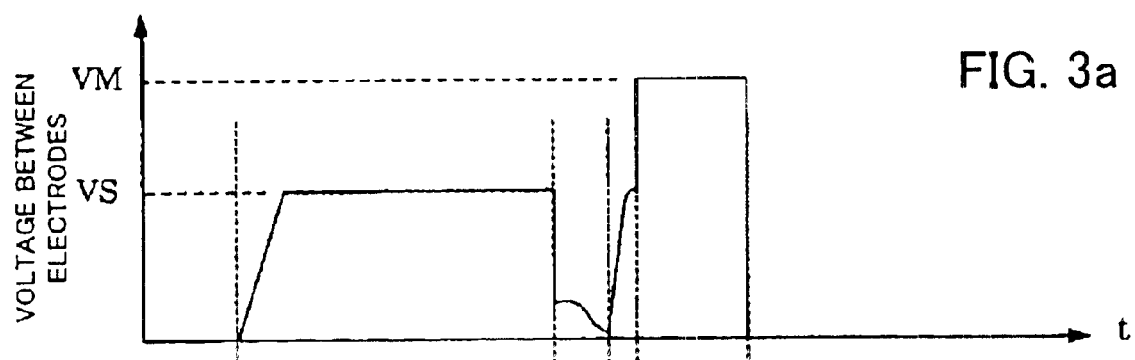
FIGS. 3a and 3b are diagrams showing a phenomenon of intermission of an electric discharge in a conventional power supply device.
Figure 3B:
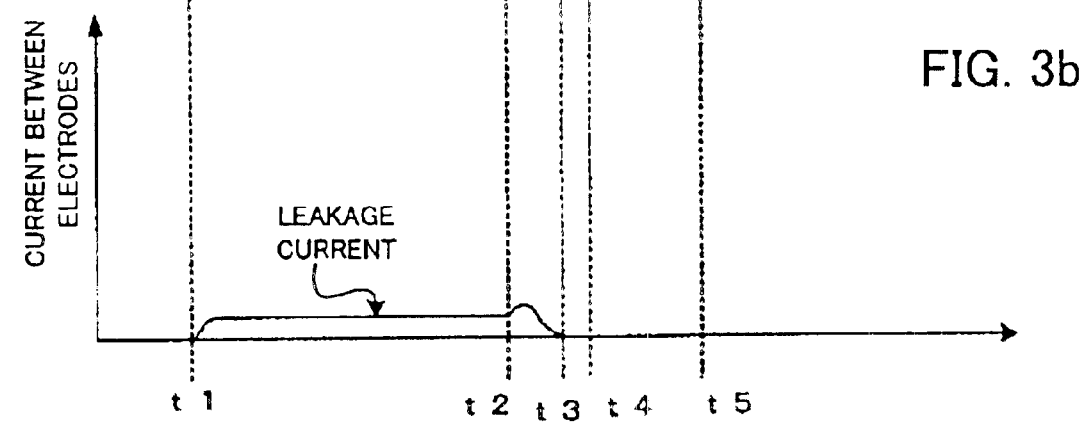
Figure 4A:
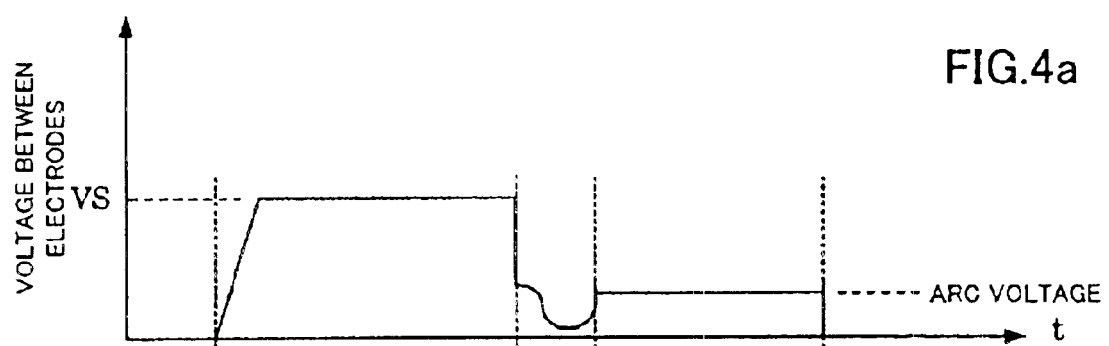
FIGS. 4a and 4b are diagrams showing an operation of the conventional power supply device when a current from a subsidiary power supply circuit is increased to prevent the intermission of the electric discharge.
Figure 4B:
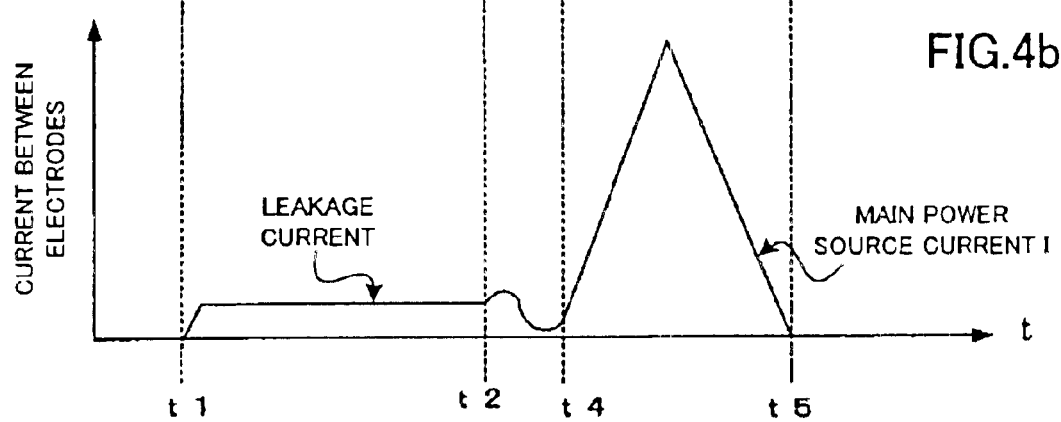

Referring to FIG. 1, a main power supply circuit 3 and a subsidiary power supply circuit 4 are connected with a workpiece 1 and an electrode 2 in parallel. The main power supply circuit comprises a series circuit composed of a main power source 31, a switching element 32 and a back flow prevention diode connected with the switching element 32 in forward direction.

The subsidiary power supply circuit 4 comprises: a series circuit comprising a subsidiary power source 41, a switching element 42 and a resistor 43; a parallel circuit composed of a current reducing resistor 44 and a capacitor 45; and a back flow prevention diode 46, which are connected in series.

A controller 5 for detecting a voltage between the workpiece 1 and the electrode 2 and on/off controlling the switching elements 42 and 32 is provided between the workpiece 1 and the electrode 2.

FIGS. 2a and 2b shows an operation of the power supply device according to the embodiment of the invention. In FIG. 2a, an axis of abscissa represents time and an axis of ordinate represents a voltage between the electrodes. In FIG. 2b, an axis of abscissa represents time and an axis of ordinate represents a current between the electrodes.

First, the controller 5 turns on the switching element 42 of the subsidiary power supply circuit 4. A voltage VS of the subsidiary power source 41 is applied between the workpiece 1 and the electrode 2 through the switching element 42, the resistor 43, the parallel circuit composed of the current reducing resistor 44 and the capacitor 45, and the back flow prevention diode 46, as shown FIG. 2a. A leakage current between the electrode 2 and the workpiece 1, as a second electrode, by the application of the voltage VS from the subsidiary power source 41 is reduced to an adequately small level by the current reducing resistor 44. Thus, the electric corrosion of the workpiece 1 and the adhesion of material of the electrode to the surface of the workpiece are suppressed.

After the application of the preliminary voltage, an electric discharge is generated and the controller 5 detects the generation of the electric discharge and turns on the switching element 32 of the main power supply circuit 3. The voltage VM of the main power source 31 is applied between the electrodes through the switching element 32 and the back flow prevention diode 33 to flow a machining current I of large amount.

There is a time delay from the generation of the electric discharge till the main current from the main power source 31 substantially rises and in this delay time a sufficiently large current is flown through the capacitor 45 since the voltage between electrodes suddenly decreases in response to the generation of the electric discharge, as shown in FIG. 2b. As a result, the electric discharge is securely maintained not to drop to "0" in the delay time by the current supplied through the capacitor 45 even if the electric discharge current fluctuates in the delay time by the oscillation of the inductance and the floating capacitance between the electrodes. This effect is available even if the electric discharge is generated immediately after the application of the voltage from the subsidiary power source 41. This is because a potential difference is made at conductors of the capacitor 45 in the state where the electric discharge is to occur between the electrodes, so that a charging current flows to the capacitor 45 sufficiently to maintain the electric discharge during the period of delay. Thus, the electric discharge is maintained in the delay time to secure a rise of the machining current I from the main power supply circuit which is to flow between the workpiece 1 and the electrode 2.

In this embodiment, the resistor 43 of an appropriate value is inserted between the parallel circuit of the current reducing resistor 44 and the capacitor 45, and the switching element 42, so as to prevent a phenomenon of superimposing of the vibration, or oscillation, of the voltage between the electrodes due to capacitance of the capacitor 45 and inductance of power cables when starting the application of the voltage between the electrodes. Thus, the resistor 43 is provided for preventing the vibration of the voltage between the electrodes.

Both of the back flow prevention diodes 33 and 46 may not necessarily be provided and only one of the diodes associated with one of the main power source 31 and the subsidiary power source 41, which has a tower voltage level than the other, may be provided to prevent a back flow into the power source which has the lower voltage. In this embodiment, both the back flow prevention diodes 33 and 46 are provided for the main power source 31 and the subsidiary power source 41, respectively, to cope with a case where the voltage level VM of the main power source 31 and the voltage level VS of the subsidiary power source 41 are reversed in dependence on a rough machining and a finish machining to be performed.

According to the present invention, an intermission of an electric discharge between the workpiece and the electrode by a preliminary voltage from a subsidiary power source in a time period from a generation of the electric discharge to a substantial rise of an machining current from a main power source is prevented to maintain the electric discharge in the delay time to realize a stable electric discharge machining without an electric corrosion of the workpiece and an adhesion of material of the electrode to a surface of the workpiece.

What is claimed is:

1. A power supply device for an electric discharge machine for machining a workpiece by an electric discharge between an electrode and the workpiece, comprising:

a subsidiary power supply circuit to urge generation of an electric discharge by applying a voltage between the electrode and the workpiece, said subsidiary power supply circuit including a direct current power source, a switching element and a parallel circuit comprising a current reducing resistor and a capacitor, which are connected in series;

a main power supplying circuit for supplying a machining current between the electrode and the workpiece; and a controller controlling said subsidiary power supply circuit to apply the voltage between the electrode and the workpiece and controlling said main power supply circuit to apply the machining current when the generation of the electric discharge between the electrode and the workpiece is detected.

2. A power supply device for an electric discharge machine according to claim 1, wherein said subsidiary power supply circuit further comprises a resistor connected in series for suppressing a vibration of the voltage between the electrode and the workpiece.

* * * * *

UNITED STATES PATENT AND TRADEMARK OFFICE
CERTIFICATE OF CORRECTION

PATENT NO. : 6,844,517 B2
DATED : January 18, 2005
INVENTOR(S) : Masao Murai et al.

It is certified that error appears in the above-identified patent and that said Letters Patent is hereby corrected as shown below:

Column 1,
Line 39, after "36", change "shows" to -- show --.

Column 2,
Line 43, after "there" change "rises" to -- arises --.
Line 55, insert -- an -- before "electric".
Line 65, before "switching" change "an" to -- a --.

Column 3,
Line 56, after "26" change "shows" to -- show --.

Column 4,
Line 1, insert -- in -- before "FIG. 2a".
Line 53, change "tower" to -- lower --.
Line 67, before "machining" change "an" to -- a --.

Signed and Sealed this

Ninth Day of August, 2005

JON W. DUDAS
*Director of the United States Patent and Trademark Office*